(12) United States Patent
Bank (10) Patent No.: US 11,258,268 B1
(45) Date of Patent: Feb. 22, 2022

(54) ELECTRICAL ENERGY TRANSMISSION SYSTEM WHICH DOES NOT REQUIRE RESERVATION

(71) Applicant: Michael Bank, Jerusalem (IL)

(72) Inventor: Michael Bank, Jerusalem (IL)

(*) Notice: Subject to any disclaimer, the term of this patent is extended or adjusted under 35 U.S.C. 154(b) by 0 days.

(21) Appl. No.: 17/317,508

(22) Filed: May 11, 2021

(51) Int. Cl.
H02J 3/46 (2006.01)
H02J 3/44 (2006.01)
H02J 3/00 (2006.01)

(52) U.S. Cl.
CPC ............... *H02J 3/46* (2013.01); *H02J 3/004* (2020.01); *H02J 3/0073* (2020.01); *H02J 3/44* (2013.01)

(58) Field of Classification Search
None
See application file for complete search history.

(56) References Cited

U.S. PATENT DOCUMENTS

| 2009/0033154 A1* | 2/2009 | Linkhart | H02J 9/06 307/65 |
| 2014/0191572 A1* | 7/2014 | Hinkle | H02J 3/0073 307/23 |
| 2015/0229232 A1* | 8/2015 | Bank | H02M 7/44 363/140 |
| 2021/0140407 A1* | 5/2021 | Gao | H02J 3/16 |

* cited by examiner

Primary Examiner — Jared Fureman
Assistant Examiner — Joel Barnett
(74) Attorney, Agent, or Firm — Henry M. Feiereisen LLC (57) ABSTRACT

An electric energy transmission system which does not need a reservation has a generator generating a multi-phase electric current, a converter converting it into another electric current, an electric current network connected with the converter and having a first group of electric current lines extending towards electric current users and a second group of electric current ones electrically connecting the electric current lines of the first group with each other, and a plurality of consumer blocks connected with the network and having users which use different electric currents and further converters converting the electric current transmitted by the network into the different electric currents and supplying the different electric currents to the electric current users.

5 Claims, 7 Drawing Sheets

ELECTRICAL ENERGY TRANSMISSION SYSTEM WHICH DOES NOT REQUIRE RESERVATION

FIELD OF THE INVENTION

The present invention relates to the field of electrical energy transmission systems. More particularly it relates to electrical energy transmission systems which are used to transmit electric current generated by multi-phase electric power sources over significantly long distances for a big number of consumers.

BACKGROUND OF THE INVENTION

Electric energy transmission systems for transmitting electric current over large distances are known, which usually include an electric current generator that generates a multi-phase electrical current, for example a three-phase electric current and transmits it through main multi-wire electric current lines or so called electric current trunk lines over significant geographic distances. These systems are analogous to a system of a horizontal tree. The trunk line which resembles a tree trunk transmits energy from an electric current generator, and then further electric current lines extend from the electric current trunk line to corresponding objects or customers which use electric currents.

If wires break in the electric current trunk line or in the electric current lines extending from it, then a part of a territory will be without electric current. In order to deal with these critical situations a 100% reservation is made by using actually at least a double of the electric current lines of the main system. This leads to double expenses for transmission of electrical energy.

The existing electrical energy transmission systems therefore use a great number of expensive wires. They also require high and expensive supports. Often the systems occupy vast parts of territories that are needed for other purposes. They also have a high level of losses associated with connection to electrical energy withdrawing lines. Furthermore, they practically make impossible to build underground and underwater lines because it is necessary to provide big distances between the wires. Finally, there are difficulties in building stations for a quick charging of vehicles because of absence along the roads of energy sources with a high voltage and a high power.

SUMMARY OF THE INVENTION

Accordingly, it is an object of the present invention to provide an electric energy transmission system which is a further improvement of the existing electric energy transmission systems.

More particularly the main object of the present invention is to provide an electric energy transmission system which does not require reservations, substantially analogously to automobile roads.

The automobile roads are designed and built so that no reservations are required. If one of the roads is closed, there is always a bypass road to drive.

In keeping with these objects and with others which will become apparent hereinafter one feature of the present invention resides briefly stated in an electrical energy transmission system which is formed as a network allowing to obtain multiple ways for running of electrical current, comprising a generator generating a multi-phase electric current, a converter converting the multi-phase electric current generated by the generator into a different electric current, an electric current network connected with the converter and having a plurality of first electric current lines extending in different directions towards electric current users and a plurality second electric current lines electrically connecting said electric current lines with each other, and a plurality of consumer blocks having users which use different electric currents and also further converters converting the electric current transmitted by said network into the different electric currents and supplying the different electric currents to the electric current users.

When the electrical energy transmission system is designed this way in accordance with the present invention, it provides for significant and highly advantageous results.

The new electrical energy transmission system provides an uninterrupted electrical energy supply even if breakages occur in some electrical energy transmitting wires since the new electrical energy transmission system always provides bypass routes for transmission of the electric current without any reserved lines used in the previously known systems, and these available bypass routes do not increase the cost of the whole new system in any significant way.

Instead of trunk ones the new system of the invention utilizes the network of relatively thin electric wires, Since as well known the electric current selects a route with the minimal resistance, in the system of the present invention the electric current in the event of a damage to some wires will be supplied through other wires, bypassing the damaged wires.

At the same time the cost of the new system for transmitting electrical energy without reserved wires as in the known systems will not be higher than the cost of the systems with reserved wires. The selection of wire diameters and thereby of its cost is determined by a value of a transmitted electrical energy and a distance. These two parameters do not change in the case of transition to the system according to the present invention since it has to transmit the same quantity of electrical energy over the same time.

The new system can be constructed with the use of single wires disclosed in our previous patent, and in this case it is possible to transmit electrical energy with this system under ground and under water. If it is necessary to increase a level of energy supply, it is very simple to add corresponding wires. In the events of addition of energy of reusable sources it is possible to utilize a simple method of current synchronization. Quick charging station can be built along automobile roadway. Finally, it is possible to execute an efficient system of reservation to supply energy not only along one direction, analogously to building of a system of automobile roadways.

The new system is significantly less expensive than the existing electrical energy transmitting systems. It has a reduced number of wires. It does not require high supports. It significantly reduces energy losses. It provides a possibility to supply energy under ground and under water. It does not cause a need to use significant spaces of nature.

If it is necessary to increase an energy level to be supplied there is a simple way to do it by adding a wire. It allows a simple way to synchronize currents in the case of adding energy from reproducible sources. It is possible to build "quick" charging stations along roadways.

It is possible to supply energy without reservation not only over one path but over a plurality of them, similarly to a system of automobile roadways.

According to a further feature of the present invention in the electrical energy transmission system the electric current consumer blocks have a three-phase electric current user and a converter converting the single-wire electric current of the single-wire electric current network into the three-phase electric current and supplying it to this user.

According to still a further feature of the present invention in the electric energy transmission system the electric current consumer blocks have a two-wire electric current user and a converter converting the single-wire electric current of the electric current network into the two-wire electric current and suppling it to this user.

According to still a further feature of the present invention in the electric energy transmission system the electric current consumer blocks have a direct current user and a converter converting the single-wire current of the electric current network into the direct current and supplying it to this user.

The present invention will be described in detail with references to the drawings which illustrate the construction and the operation of the inventive electric current generation and transmission system.

DESCRIPTION OF THE PREFERRED EMBODIMENTS

Figure 1:
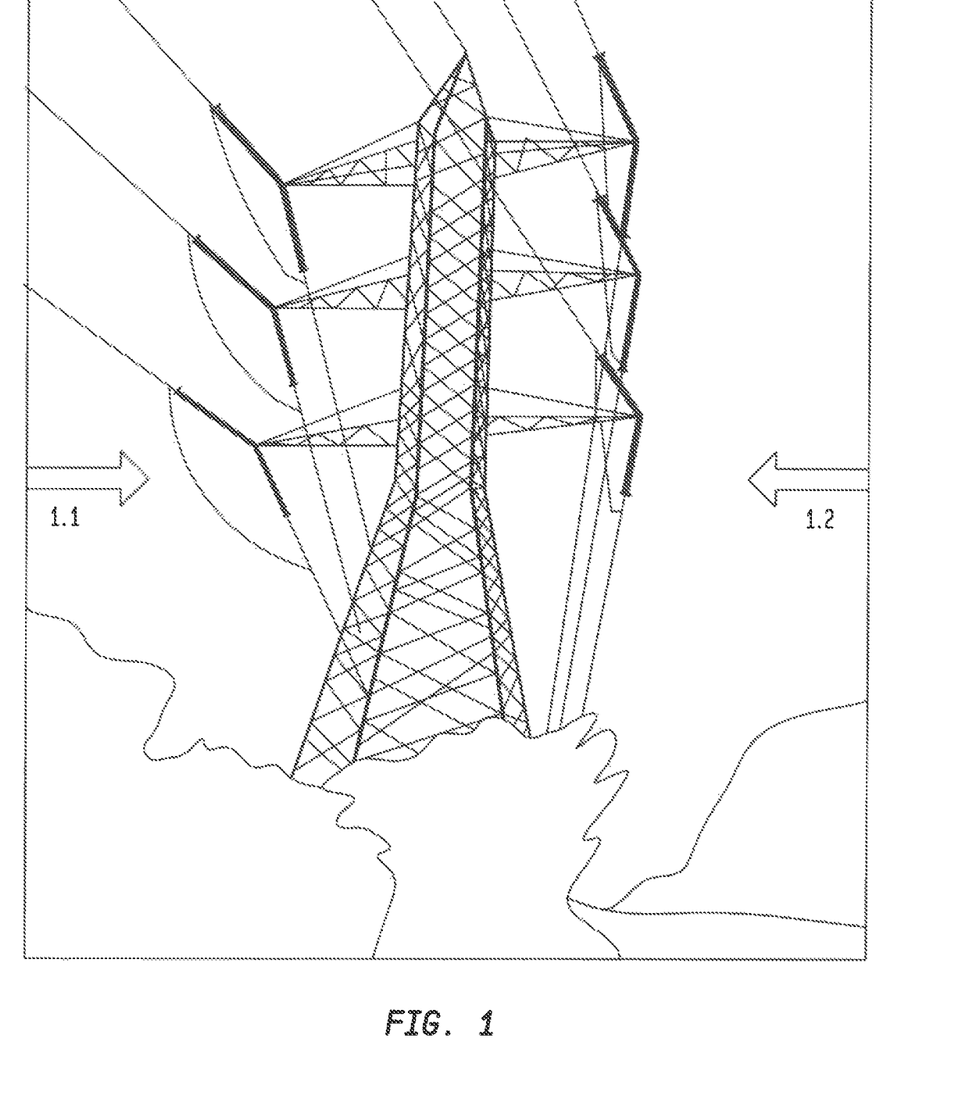
FIG. 1 of the drawings is a view showing a known conventional electrical energy transmission system.

FIG. 1 shows a known electrical energy transmission system for transmitting electric current over large distances. It usually includes several main electric current transmission wires which transmits electric current over significant geographic distances as shown for example on the left side of this figure, and also reserved electric current transmission lines which are shown at the right side of this figure. As mentioned above, this leads to double expenses for transmission of electrical energy.

Figure 2:
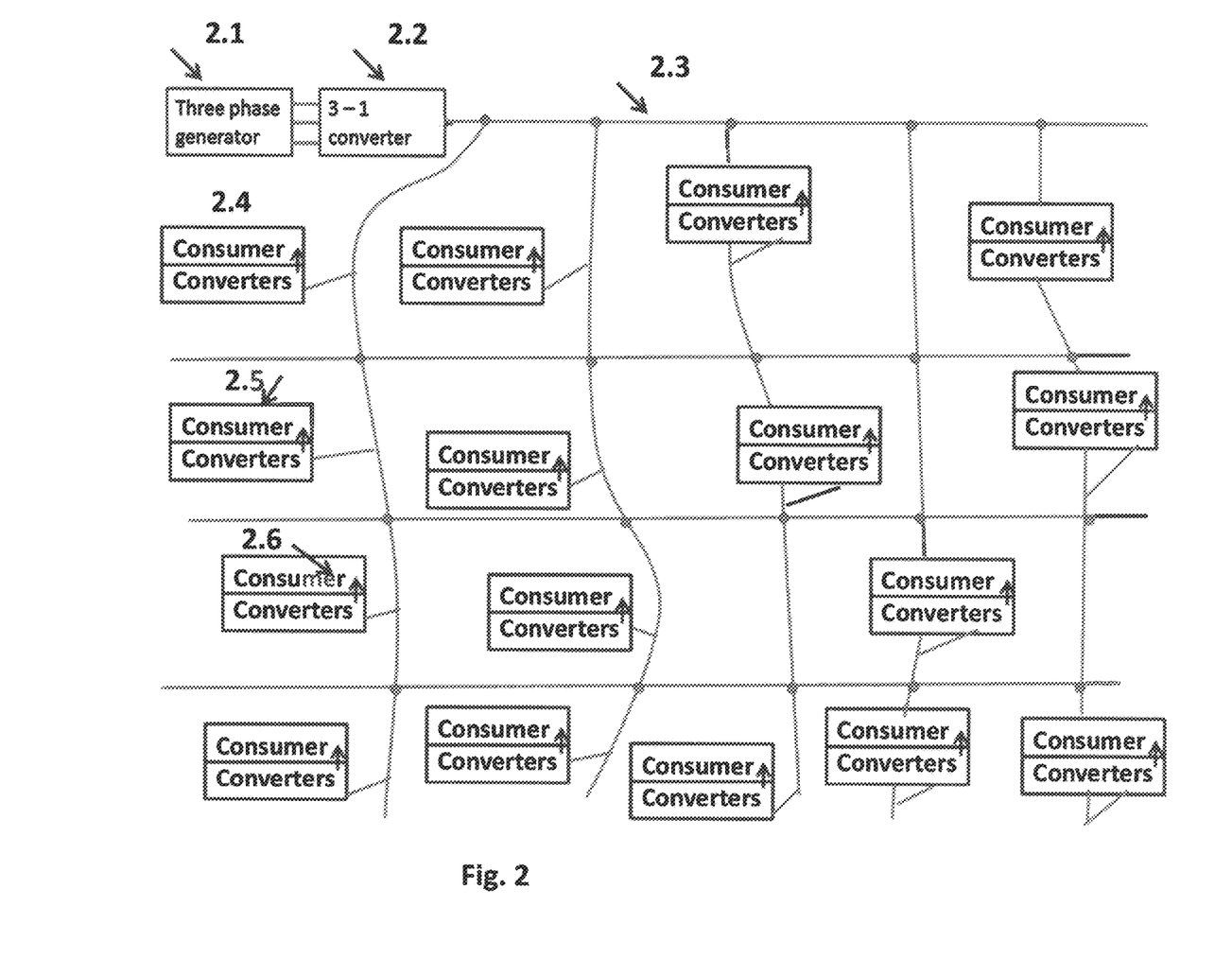
FIG. 2 is a view showing an electric energy transmission system according to the present invention, having a network of electric current lines.

An electrical energy transmission system of the present invention is shown in FIG. 2. It has an electric current generator generating a multi-phase electric current for example a three-phase electric current and identified with reference numeral 2.1.

An electric current converter 2.2 is located after the multi-phase electric current generator 2.1. It receives the multi-phase electric current generated by the multi-phase electric current generator 2.1 and converts it into another current, for example into a single-wire electric current, with a possible increase of its voltage.

The electrical energy transmission system of the present invention further has a network 2.3 of for example single-wire electric current lines, which has a plurality of for example first single-wire electric current lines (first group of lines) extending in different directions towards electric current users and a plurality second for example single-wire electric current lines (second group of lines) electrically connecting said first single-wire electric current lines with each other.

The network of single-wire electric current lines receives from the converter 2.2 the single-wire electric current and transmits the received single-wire electric current over significant geographic distances to a plurality of electric current consumer blocks 2.4, 2.5, 2.6.

Figure 3:
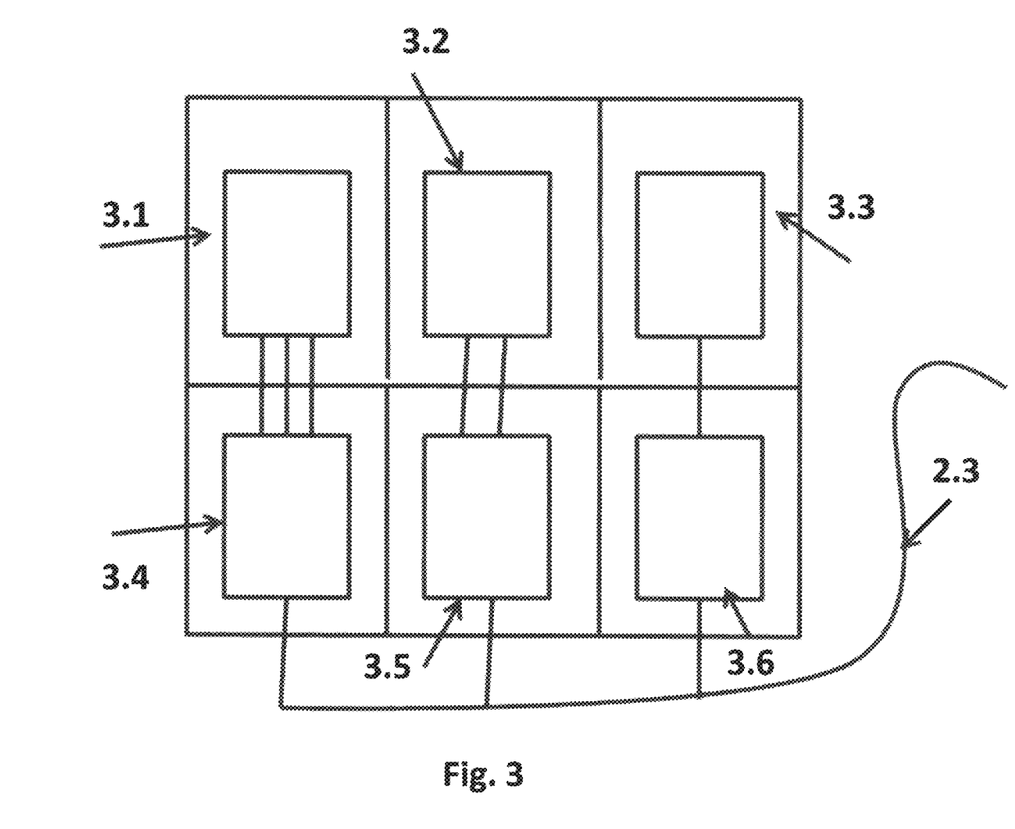
FIG. 3 is a view showing one of the consumer blocks of the electric energy transmission system according to the present invention.

The electric current consumer blocks are shown in FIG. 3. They are spaced from each other and can include a part connected with the single-wire electric current line of the single-wire electric current network 2.3 and having a converter 3.4 converting the single-wire electric current of the network 2.3 into a three-phase electric current, or a converter 3.5 converting the single-wire electric current of the network 2.3 into a two-wire electric current, or a converter 3.6 converting the single-wire electric current of the network 2.3 into a direct current, or a combination of the converters 3.4, 3.5, 3.6.

Each of the electric current consumer blocks can have further a three-phase electric current user or device 3.1, or a two-wire electric current user or device 3.2, or a direct electric current user or device 3.3, or a combination of the users. In order to supply these electric current users or devices with currents the outlet of the converter 3.4 is connected with the electric current user 3.1 and supplies the latter with the three-phase electric current. The converter 3.5 is connected with the electric current user 3.2 and supplies the latter with the two-wire electric current, the outlet of the converter 3.6 is connected with the electric current user 3.3 and supplies the latter with the direct electric current user.

Figure 4:
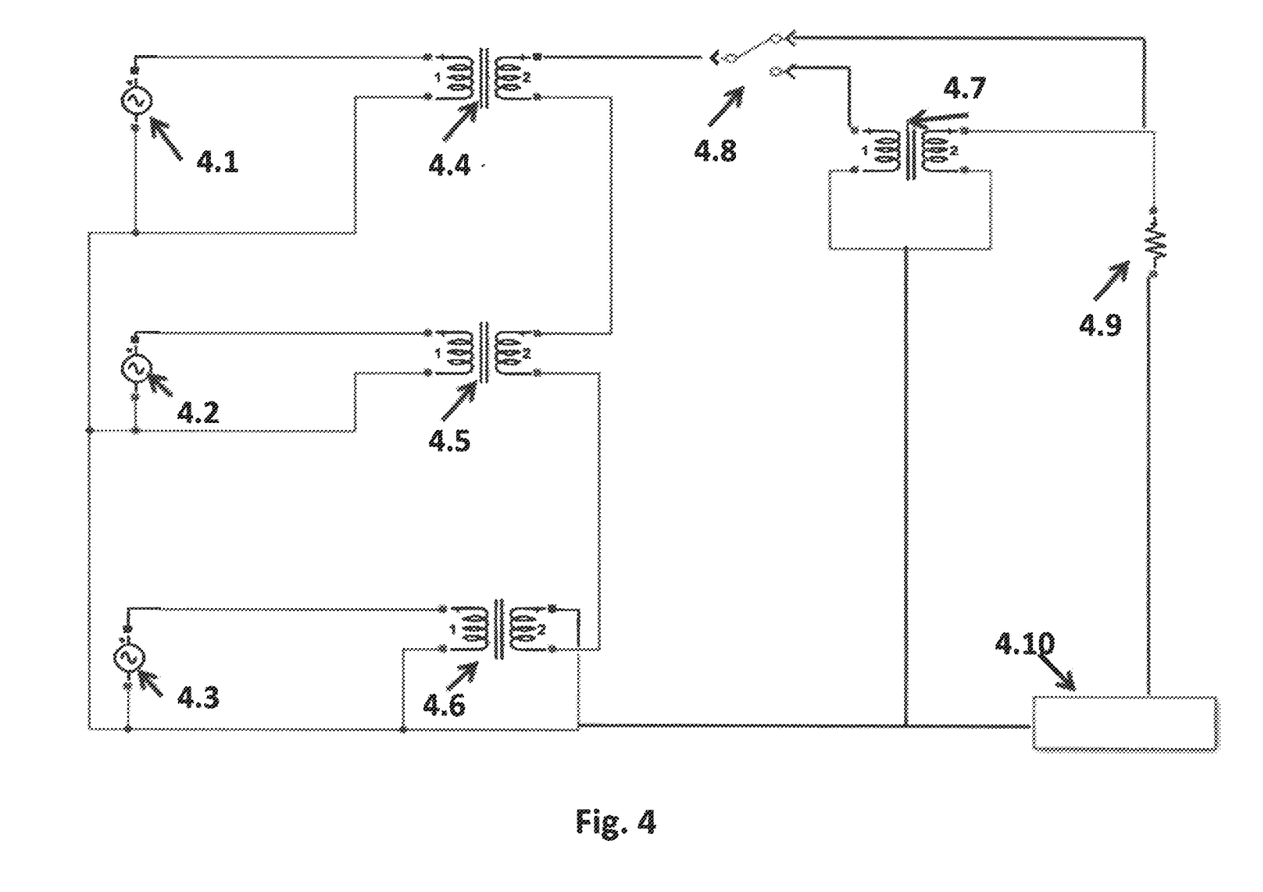
FIG. 4 is a view showing a converter which converts a multi-phase electric current of an electrical generator into a single-wire electric current to be transmitted in the network of the single-wire electric current lines, according to the present invention.

FIG. 4 shows a converter which converts a multi-phase, in this case three-phase electric current into a single-wire electric current. The three-phase electric current is supplied from 3 sources 4.1, 4.2, 4.3. Its three currents are supplied to primary windings of transformers 4.4, 4.5, 4.6 whose secondary winding are connected in series. The transformer 4.7 allows obtaining a required voltage of a load 4.9. A nullifier 4.10 provides a point with a zero voltage.

Figure 5:
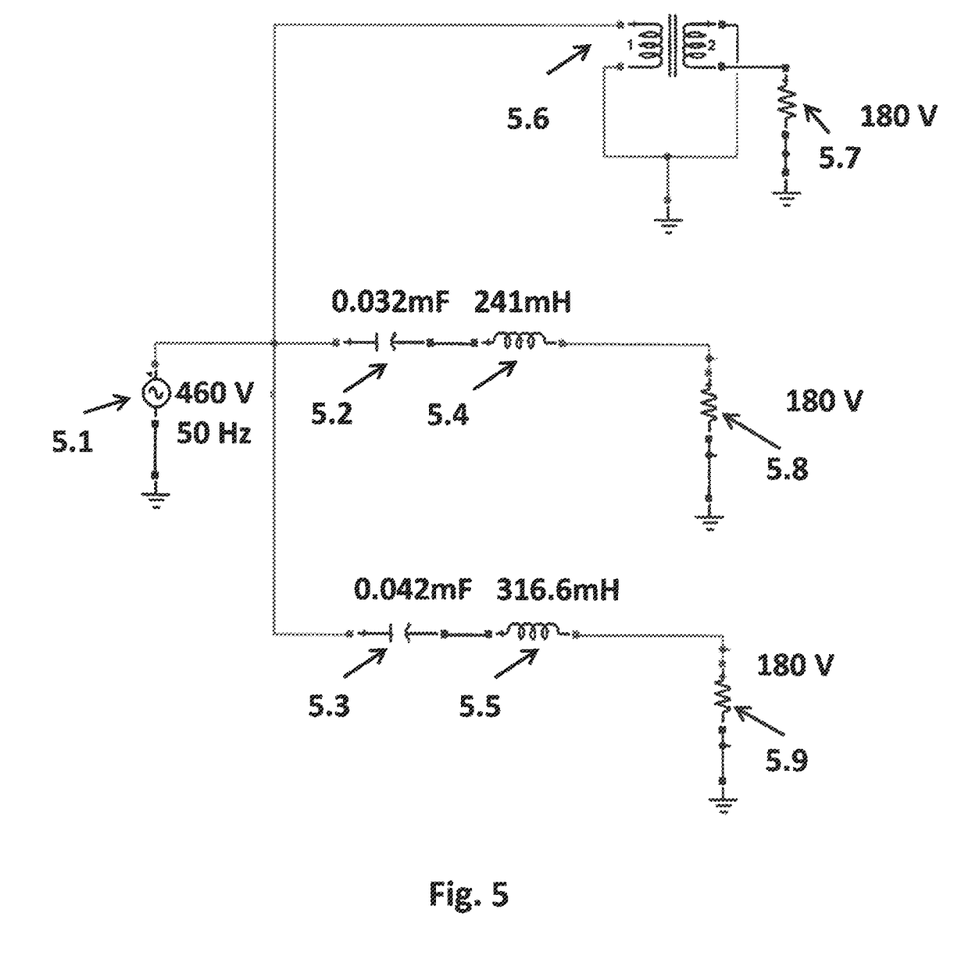
FIG. 5 is view showing a converter which converts a single-wire electric current transmitted through the network of the single-wire electric current lines into a three-phase electric current supplied to a three-phase electric current user of the system according to the present invention.

FIG. 5 shows a converter which converts a single-wire electric current into a three-phase electric current. For this purpose the entering single-wire electric current is divided into 3 currents. First current is inverted by a transformer 5.6 with the windings connected towards one another. Two other currents pass through resonance contours 5.2-5.4 and 5.3-5.5 for obtaining required phase shifts + and −60 degrees on phase loads 5.7, 5.8, 5.9.

Figure 6:
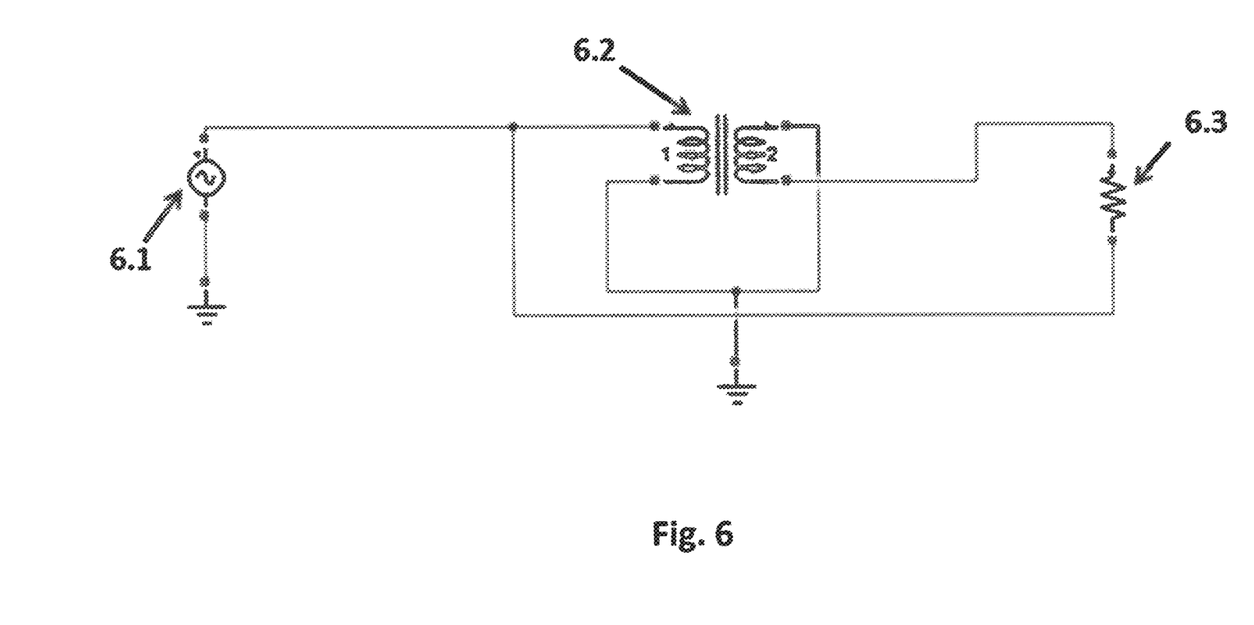
FIG. 6 is view showing a converter which converts a single-wire electric current transmitted through the network of the single-wire electric current lines into a two-wire electric current supplied to a two-wire electric current user of the system according to the present invention.

FIG. 6 shows a converter which converts a single-wire electric current into a two-phase electric current. A signal from a generator 6.1 is divided into two signals, one of which (the upper one) is inverted by a transformer with oppositely switched winding 6.2. Both obtained currents can be supplied at load 6.3.

Figure 7:
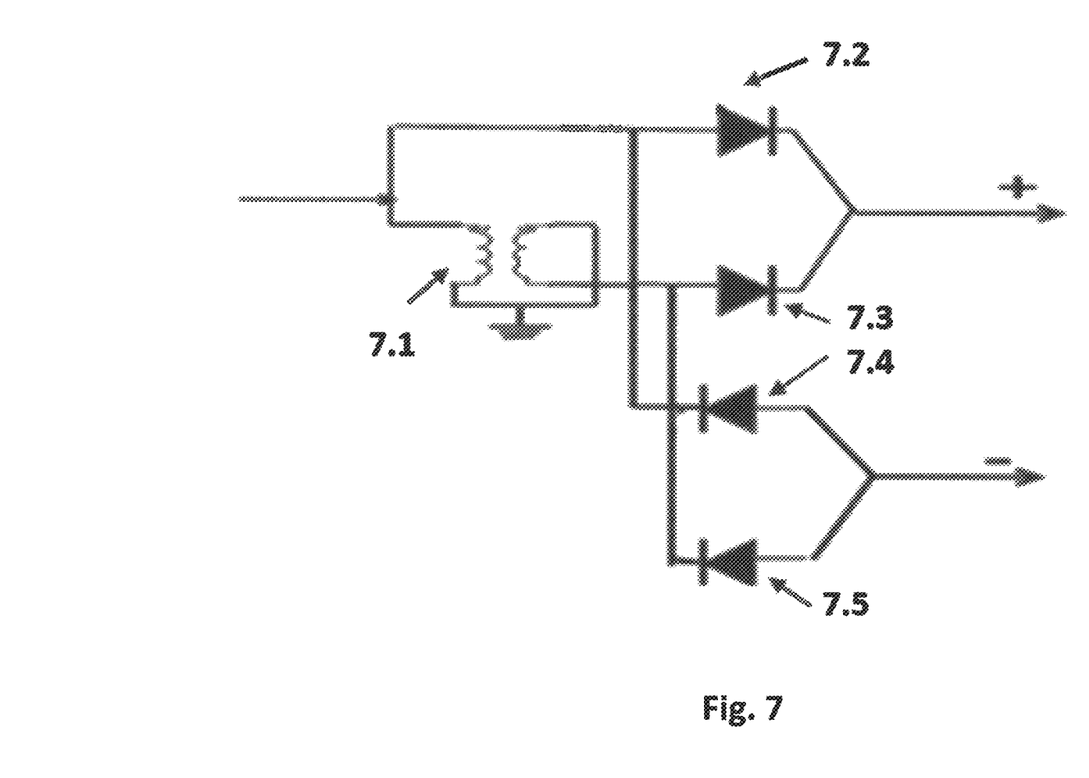
FIG. 7 is view showing a converter which converts a single-wire electric current transmitted through the network of the single-wire electric current lines into a direct electric current supplied to a direct electric current user of the system according to the present invention.

FIG. 7 shows a converter which converts a single-wire current into a DC current. The single-wire current is divided by 7.1 into two currents. One of the currents, the lower one, is inverted. Then both currents are supplied to two oppositely switched diodes 7.2, 7.5. The signals of the same polarity are summated and supplied to exits + and −.

In the present invention the network 2.3 is composed completely of single-wire electric current transmission lines. The single-wire transmission lines are electric current transmission lines which are composed of one wire only or of several wires which are twisted together to form a single electric current transmission line. The single-wire electric current network of the present invention is connected directly, without a trunk line, to a single-current source, in this case in particular to the converter 2.2 which receives the electric current from the generator 2.1.

All converters were verified by a simulation using a program Simulink. The results of the simulation are shown in the drawings in form of values of currents. An inlet signal is shown in form of generators of voltage. An exit signal is shown in form of voltages on loads, which represent equivalents of the inlet voltage of the block, where the signal of the given block is supplied.

What is desired to be protected by Letters Patent is set forth in the appended claims.

I claim:

1. An electric energy transmission system, comprising a generator generating a multi-phase electric current; a converter converting the multi-phase electric current generated by the generator into another electric current; an electric current network transmitting said another electric current and having a first group of electric current lines extending in directions towards electric current users and a second group of electric current lines electrically connecting the electric current lines of the first group with each other; and a plurality of electric current consumer blocks connected with said electric current network and having electric current users which use different electric currents and further converters converting said another electric current transmitted by said electric current network into the different electric currents and supplying the different electric currents to the electric current users.

2. The electric energy transmission system as defined in claim 1, wherein the electric current consumer blocks have a three-phase electric current user, and the further converter converting the electric current transmitted by the electric current network into the three-phase electric current is connected with the three-phase electric current user and supplies this current to this user.

3. The electric energy transmission system as defined in claim 1, wherein the electric current consumers blocks have a two-wire electric current user, and the further converter converting the electric current transmitted by the electric current network into the two-wire electric current is connected with the two-wire electric current user and supplies this current to this user.

4. The electric energy transmission system as defined in claim 1, wherein the electric current consumers blocks have a direct electric current user, and the further converter converting the electric current transmitted by the electric current network into the direct electric current is connected with the direct electric current user and supplies this current to the latter.

5. The electric energy transmission system as defined in claim 1, wherein the converter converting the multi-phase electric current generated by the generator into another electric converts the multi-phase electric current into a single-wire electric current, and the electric current network connected with the converter transmits the single-wire electric current to the electric current consumer blocks.

* * * * *